(12) United States Patent
Cho et al.

(10) Patent No.: US 8,491,716 B2
(45) Date of Patent: Jul. 23, 2013

(54) INORGANIC HOLLOW YARNS AND METHOD OF MANUFACTURING THE SAME

(75) Inventors: Churl-Hee Cho, Daejeon (KR); Do-Kyung Kim, Daejeon (KR); Jeong-Gu Yeo, Daejeon (KR); Young-Soo Ahn, Daejeon (KR); Dong-Kook Kim, Daejeon (KR); Hong-Soo Kim, Daejeon (KR)

(73) Assignee: Korea Institute of Energy Research (KR)

( * ) Notice: Subject to any disclaimer, the term of this patent is extended or adjusted under 35 U.S.C. 154(b) by 216 days.

(21) Appl. No.: 12/878,900

(22) Filed: Sep. 9, 2010

(65) Prior Publication Data

US 2011/0159221 A1    Jun. 30, 2011

(30) Foreign Application Priority Data

Dec. 31, 2009    (KR) .................. 10-2009-0135865

(51) Int. Cl.
*C09D 5/00* (2006.01)
*C22C 29/00* (2006.01)
*C22C 29/02* (2006.01)
*C22C 29/12* (2006.01)
*C22C 29/16* (2006.01)

(52) U.S. Cl.
CPC . *C09D 5/00* (2013.01); *C22C 29/00* (2013.01); *C22C 29/02* (2013.01); *C22C 29/12* (2013.01); *C22C 29/16* (2013.01)
USPC .............. 106/287.35; 106/170.1; 106/170.34; 106/170.37; 106/170.4; 106/170.58; 106/287.18; 106/287.2; 106/287.23; 106/287.24; 106/287.25; 106/287.26; 106/287.3; 524/401; 524/424; 524/428; 524/430; 524/439; 419/4; 264/632; 264/634; 156/89.11; 156/89.27; 156/89.28

(58) Field of Classification Search
USPC ................. 156/89.11, 89.27, 89.28; 264/632, 264/634; 419/4; 524/401, 424, 428, 430, 524/439; 106/170.1, 170.34, 170.37, 170.4, 106/170.58, 287.18, 287.2, 287.23, 287.24, 106/287.25, 287.26, 287.3, 287.35
See application file for complete search history.

(56) References Cited

U.S. PATENT DOCUMENTS

| | | | | |
|---|---|---|---|---|
| 4,222,977 | A * | 9/1980 | Dobo ............................ | 264/634 |
| 4,948,763 | A * | 8/1990 | Hayashida et al. .......... | 501/95.1 |
| 5,030,600 | A * | 7/1991 | Hida et al. ................... | 501/98.3 |
| 5,453,232 | A * | 9/1995 | Hida et al. ................... | 501/97.2 |
| 6,355,338 | B1 * | 3/2002 | Hilmas et al. ............... | 428/297.1 |
| 6,899,777 | B2 * | 5/2005 | Vaidyanathan et al. ... | 156/89.11 |
| 2011/0064789 | A1 * | 3/2011 | Touati et al. .................. | 424/450 |

FOREIGN PATENT DOCUMENTS

| | | |
|---|---|---|
| JP | 2-74616 A | 3/1990 |
| JP | 2-104726 A | 4/1990 |
| KR | 10-1983-0000975 B1 | 5/1983 |
| KR | 10-1995-0007175 B1 | 7/1995 |
| KR | 10-0257479 B1 | 3/2000 |
| WO | 96/00125 | 1/1996 |

* cited by examiner

Primary Examiner — David M Brunsman
(74) Attorney, Agent, or Firm — Lowe Hauptman Ham & Berner, LLP

(57) ABSTRACT

Disclosed herein is a method of manufacturing inorganic hollow yarns, such as cermets, oxide-non oxide composites, poorly sinterable non-oxides, and the like, at low costs. The method includes preparing a composition comprising a self-propagating high temperature reactant, a polymer and a dispersant, wet-spinning the composition through a spinneret to form wet-spun yarns, washing and drying the wet-spun yarns to form polymer-self propagating high temperature reactant hollow yarns, and heat-treating the polymer-self propagating high temperature reactant hollow yarns to remove a polymeric component from the polymer-self propagating high temperature reactant hollow yarns while inducing self-propagating high temperature reaction of the self-propagating high temperature reactant to form inorganic hollow yarns. The composition comprises 45~60 wt % of the self-propagating high temperature reactant, 6~17 wt % of the polymer, 0.1~4 wt % of the dispersant, and the balance of an organic solvent.

10 Claims, 7 Drawing Sheets

INORGANIC HOLLOW YARNS AND METHOD OF MANUFACTURING THE SAME

CROSS-REFERENCE TO RELATED APPLICATIONS

This application claims priority to and the benefit of Korean Patent Application No. 10-2009-0135865 filed on Dec. 31, 2009, the contents and teachings of which are hereby incorporated by reference in their entirety.

BACKGROUND

1. Field

The present invention relates to inorganic hollow fibers or yarns.

2. Description of the Related Art

Inorganic hollow yarns have a hollow center and are widely used due to merits, such as a very high membrane area per volume, good productivity, and the like. Thus, when inorganic membranes are produced using the inorganic hollow yarns, the membranes may be applied to processes such as water treatment, gas separation, liquid separation, dust filtration, membrane reaction, catalyst carriers, air conditioning, and the like.

SUMMARY

One aspect of the present invention is to provide a composition for inorganic hollow yarns, which may be used to produce cermet hollow yarns (ceramic-metal composite hollow yarns,) oxide-non oxide composite hollow yarns, and poorly sinterable non-oxide hollow yarns.

Another aspect of the present invention is to provide a method of manufacturing inorganic hollow yarns using the composition through self-propagating high temperature reaction.

In accordance with one aspect of the invention, a composition for inorganic hollow yarns includes 45~60% by weight (wt %) of a self-propagating high temperature reactant, 6~17 wt % of a polymer, 0.1~4 wt % of a dispersant, and the balance of an organic solvent.

The self-propagating high temperature reactant may be a material capable of forming one of a ceramic-metal composite, an oxide-non oxide composite, and a poorly sinterable non-oxide composite.

In accordance with another aspect of the invention, a method of manufacturing inorganic hollow yarns includes: preparing a composition comprising a self-propagating high temperature reactant, a polymer, and a dispersant; wet-spinning the composition through a spinneret to form wet-spun yarns; washing and drying the wet-spun yarns to form polymer-self propagating high temperature reactant hollow yarns; and heat-treating the polymer-self propagating high temperature reactant hollow yarns to remove a polymeric component from the polymer-self propagating high temperature reactant hollow yarns while inducing self-propagating high temperature reaction of the self-propagating high temperature reactant to form inorganic hollow yarns.

DETAILED DESCRIPTION OF EMBODIMENTS

Figure 1:
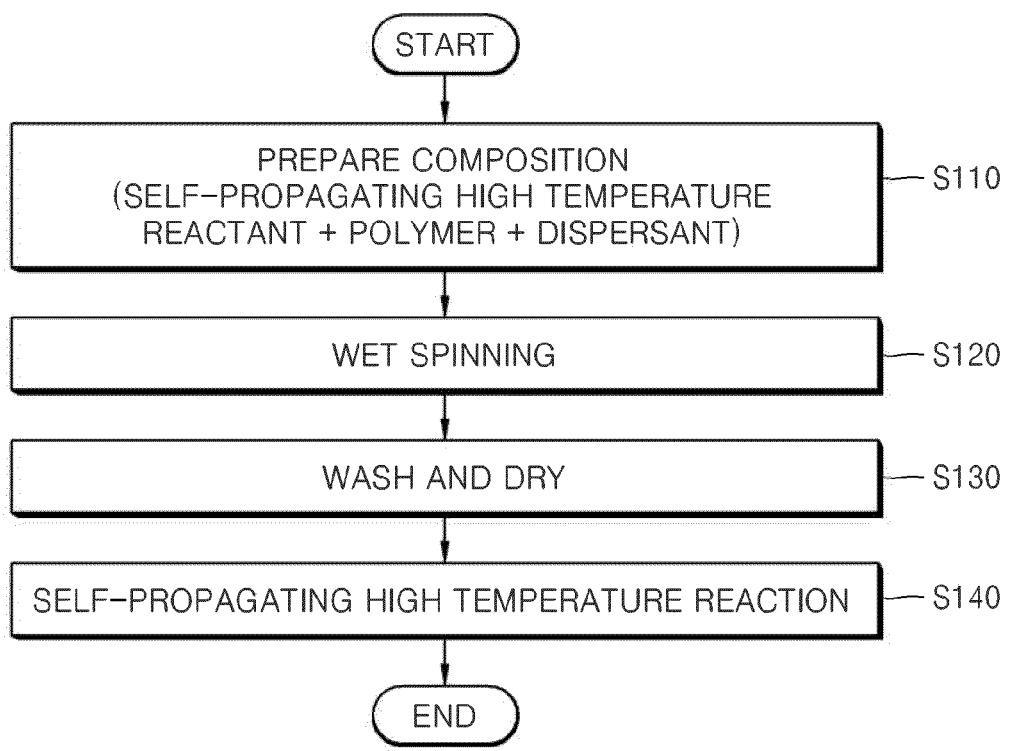
FIG. 1 is a flowchart of a method of manufacturing inorganic hollow yarns in accordance with an embodiment of the present invention.

The above and other aspects, features and advantages of the invention will become apparent with reference to the following embodiments in conjunction with the accompanying drawings. Here, it should be noted that the invention is not limited to the following embodiments and may be realized in many different forms. Further, the following embodiments are given by way of illustration to provide a thorough understanding of the invention to a person having ordinary knowledge in the art, to which the invention pertains. The scope and spirit of the invention is limited only by the claims and equivalents thereof. Like elements will be denoted by like reference numerals throughout the specification and drawings.

Embodiments of the present invention will now be described in detail with reference to the accompanying drawings.

Method Using High Temperature Sintering

Conventionally, inorganic hollow yarns are manufactured using various methods.

In one method, a polymer and inorganic particles are sufficiently dispersed in an organic solvent, and are then spun through a spinneret to produce polymer-inorganic hollow yarns, which in turn are subjected to heat treatment and sintering to form final inorganic hollow yarns. In this method, the inorganic particles are subjected to sintering, and sintering additives may be added for effective sintering. Examples of the inorganic hollow yarns produced by this method may include $Al_2O_3$ hollow yarns, $ZrO_2$ hollow yarns, Ni hollow yarns, Ni—Fe hollow yarns, Perovskite hollow yarns, $Si_3N_4$ hollow yarns, and the like.

In another method, carbon and a Si—C polymer precursor are spun through a spinneret to produce hollow yarns, which in turn are subjected to heat treatment in a specific gas atmosphere. Examples of the inorganic hollow yarns produced by this method may include SiC hollow yarns, $Si_3N_4$ hollow yarns, carbon hollow yarns, and the like.

In both methods described above, it is necessary to perform heat treatment at high temperature, which results in large energy consumption, and pore structures of the hollow yarns are determined by inorganic particles, particle growth and densification of reactants during the heat treatment.

Method Using Low Temperature Sintering

Most inorganic hollow yarns are oxide hollow yarns, such as $Al_2O_3$ hollow yarns. These $Al_2O_3$ hollow yarns need sintering at low temperatures to accomplish a high level of porosity of 30~50%, which is a precondition for use as an inorganic membrane supporter. However, if the sintering is performed at low temperatures, the hollow yarns loose strength due to low density and are likely to be broken during subsequent processes, such as membrane modulation, reproduction, and the like.

Method for High Strength and High Porosity Inorganic Yarns Needed

Accordingly, there is a need for a technique capable of manufacturing inorganic hollow yarns having high strength and high porosity. Examples of such inorganic hollow yarns include cermet hollow yarns, which are ceramic-metal composite hollow yarns, oxide-non oxide composite hollow yarns, poorly sinterable non-oxide hollow yarns, etc.

Some Other Methods

Now discussed are certain methods of manufacturing inorganic hollow yarns. In a first exemplary method, a polymer and oxide particles, for example, NiO and $Fe_2O_3$, are dispersed in an organic solvent, followed by wet spinning and solvent exchange to produce polymer/NiO and polymer/NiO—$Fe_2O_3$ hollow yarns, which in turn are sintered in a reduction atmosphere, thereby forming Ni, Ni—Fe hollow yarns for hydrogen separation. Here the Ni, Ni—Fe hollow yarns have a completely dense structure.

In a second exemplary method, a carbon hollow yarn membrane is produced by thermal decomposition of a cellulose precursor. Then, carbon hollow yarns are produced by spinning and carbonizing a phenol resin, pitch, polyimide, poly acrylonitrile (PAN), and the like using the same method. Here, the carbon hollow yarns have a fine micropore structure.

In a third exemplary method, a polymer and $Al_2O_3$ particles as oxide particles are dispersed in an organic solvent, followed by wet spinning and solvent exchange to produce polymer/$Al_2O_3$ hollow yarns, which in turn are subjected to heat treatment, thereby forming fine porous $Al_2O_3$ hollow yarns.

In a fourth exemplary method, SiC, $Si_3N_4$-based hollow yarns are produced by melt spinning an organic silazane polymer, infusibilizing the yarns to form an infusible layer on the surface of the yarns, and thermal decomposition of the yarns. The infusibilizing process includes processing the hollow yarns in a gas containing Si, B, P, and metal compound vapors and further processing the hollow yarns in a gas containing water or ammonia. The hollow yarns prepared by this method may be effectively sintered to produce porous silicon-based hollow yarns.

In a fifth exemplary method, a thermoplastic polymer is mixed with $Si_3N_4$ and $Al_2O_3$ particles, followed by melt spinning to prepare polymer-ceramic hollow yarns, which in turn are sintered to form $Si_3N_4$ hollow yarns. Further, in this method, a thermosetting polymer and ceramic particles are mixed with water and compressed to form polymer-ceramic hollow yarns, which in turn are sintered to form ceramic hollow yarns.

Composition for Inorganic Hollow Yarns

A composition for inorganic hollow yarns according to an embodiment includes a self-propagating high temperature reactant, a polymer, a dispersant, and an organic solvent.

Self-Propagating High Temperature Reactant

The self-propagating high temperature reactant is a raw material capable of inducing self-propagating high temperature reaction. When a local reaction of the self-propagating high temperature reactant is initiated by heat treatment at a relatively low temperature, the self-propagating high temperature reaction spontaneously occurs using the heat generated from the initial reaction, which is a strong exothermic reaction. With the heat from the exothermic reaction, the temperature reaches several thousand degrees Celsius, which far exceeds the temperature of the heat treatment.

The self-propagating high temperature reactant may form cermets, such as $Al_2O_3$/Fe, $Al_2O_3$/Ni, 4C/Fe, and TiC/Ni; poorly sinterable non-oxides, such as TiC, $TiB_2$, SiC, and $Si_3N_4$; oxide-non oxide composites, such as $Al_2O_3$/SiC, $Al_2O_3$/TiC, and the like, through self-propagating high temperature reaction.

For example, when preparing $Al_2O_3$—TiC—Ti hollow yarns through the self-propagating high temperature reaction, $3TiO_2$-4Al-1.5C may be provided as a self-propagating high temperature reactant. In addition, when preparing TiC—Ni hollow yarns through the self-propagating high temperature reaction, Ti—C—Ni may be provided as a self-propagating high temperature reactant. Further, when preparing TiB2 hollow yarns through the self-propagating high temperature reaction, Ti-2B may be provided as a self-propagating high temperature reactant.

Although a fine reactant powder exhibits good properties when used in the self-propagating high temperature reactant, too fine a reactant powder can be oxidized to stop the self-propagating high temperature reaction during wet spinning and drying. It is desirable to set the size of the reactant powder depending on the self-propagating high temperature reactant.

The composition may contain the self-propagating high temperature reactant in an amount of 45~60 wt %. In order to ensure self-propagating high temperature reaction, it is preferable that the self-propagating high temperature reactant is contained at least about 45 wt % in the composition. On the other hand, to maintain moderate viscosity of the composition, which is needed for wet spinning, it is preferable that the self-propagating high temperature reactant is contained about 60 wt % or less in the composition.

Polymer

The polymer serves to maintain the shape of the inorganic hollow yarn and determines the microstructure of the inorganic hollow yarn. Examples of the polymer include polysulfone, polyethersulfone, polyacrylronitrile, cellulose acetate, polyvinylidene fluoride, polyimide, and the like. These polymers may be used alone or in a combination of two or more thereof.

The composition may include the polymer in an amount of 6~17 wt %. Efficient performance of the wet spinning is needed to maintain the shape of the hollow yarn. It is preferable to include about 6 wt % of polymer to accomplish such a degree of wet spinning. On the other hand, it is preferable to include the polymer about 17 wt % or less to avoid excessive increase of the viscosity, which may make it difficult to achieve efficient wet spinning.

Dispersant

The dispersant serves to promote dispersion of the self-propagating high temperature reactant while controlling the viscosity of the composition during preparation of the composition. Any suitable dispersant may be selected depending on the kinds of organic solvent and polymer. When polysulfone is used as the polymer and N-methyl-2 pyrrolidone (NMP) is used as the organic solvent in the composition, polyvinylpyrrolidone (PVP), polyethyleneglycol (PEG) and the like may be selected as the dispersant. In some embodiments, the dispersant includes two or more of polyvinylpyrrolidone (PVP), polyethyleneglycol (PEG) and their equivalents that are known in the art.

The composition may include the dispersant in an amount of 0.1~4 wt %. It is preferable to include the dispersant is at least about 0.1 wt % in order to accomplish generally uniform wet spinning as the self-propagating high temperature reactant powders have relatively low dispersion. On the other hand, it is preferable to include the dispersant about 4 wt % or less to maintain the viscosity of the composition at a level for efficient wet spinning.

Organic Solvent

The organic solvent serves to peptize the polymer and dispersant while acting as a dispersant medium for the self-propagating high temperature reactant. Any suitable organic solvent may be selected depending on the kind of polymer. Examples of the organic solvent may include dimethylformamide, N-methyl-2-pyrrolidone, dimethylamide, dimethylacetamide, dimethyl sulfoxide, 1,4-dioxane, ethylene glycol monomethyl ether, ethylene glycol monoethyl ether, diethylene glycol dimethyl ether, diethylene glycol diethyl ether, diethylene glycol dibutyl ether, and the like. These solvents may be used alone or in a combination of two or more thereof.

Diluent

In some embodiments, the composition may further include a diluent such as oxide, nitride, carbide, metal, and the like. The diluent enables control of a self-propagating high temperature reaction speed and a microstructure of the inorganic hollow yarn by adjusting adiabatic temperature of the self-propagating high temperature reaction.

The diluent may be added up to an amount of 50 parts by weight with respect to 100 parts by weight of self-propagating high temperature reactant. If the amount of diluent exceeds 50 parts by weight, the self-propagating high temperature reaction may not occur.

Method of Manufacturing Inorganic Hollow Yarns

FIG. 1 is a flowchart of a method of manufacturing inorganic hollow yarns in accordance with an embodiment of the present invention.

Referring to FIG. 1, the method of manufacturing inorganic hollow yarns includes preparing a composition in S110, wet spinning in S120, washing and drying in S130, and inducing self-propagating high temperature reaction in S140.

In S110, the composition is prepared by dispersing a self-propagating high temperature reactant, polymer, and dispersant in the organic solvent. In some embodiments, the composition contains 45~60% wt % of the self-propagating high temperature reactant, 6~17 wt % of the polymer, 0.1~4 wt % of the dispersant, and the balance of the organic solvent.

In one embodiment, the composition is dispersed using a wet-type ball mill. In another embodiment, a rod mill can be used.

In one embodiment, the composition may be prepared in the form of a slurry by dispersing the self-propagating high temperature reactant, polymer, and dispersant in the organic solvent. Then, the slurry composition may be subjected to a ball-mill process, which may be carried out using a ceramic ball mill at 100~400 rpm for 4~168 hours, although not limited thereto. The prepared composition slurry may be subjected to degasification at 30~80° C. for 4~24 hours, although not limited thereto, in a vacuum or a negative pressure environment.

Although not limited thereto and depending upon particular conditions, if the rotating speed of the ball mill is less than 100 rpm, ceramic balls may not easily move from a lower end of the ball mill to an upper end thereof. On the other hand, although not limited thereto and depending upon particular conditions, if the rotating speed of the ball mill exceeds 400 rpm, the ceramic balls may rotate together with the slurry, causing insufficient dispersion of the composition slurry.

Further, the degasification removes bubbles staying in the composition slurry and reduce the possibility of bursting of hollow yarns during wet spinning.

Next, in S120, the composition slurry is subjected to wet spinning, for example, using a triple-spinneret. Here, three diameters determining inner and outer orifices of the spinneret are set in consideration of inner and outer diameters of desired inorganic hollow yarns. The composition slurry is introduced into the outer orifice of the triple-spinneret by a gear pump, which may be operated at 5~18 rpm, although not limited thereto. Further, water may be introduced at an introduction speed of 8~20 ml/min at a pressure of 1~6 MPa into the inner orifice of the triple-spinneret by an LC pump.

Next, the slurry of hollow yarns spun through the triple spinneret is dropped into a washing bath containing with water. A distance between an inlet of the triple spinneret and a surface of the water may be 100 cm or less. The organic solvent in the slurry of the spun hollow yarns is exchanged with the water introduced into the inner orifice of the triple spinneret and filling the washing bath, so that polymer-self propagating high temperature reactant hollow yarns are formed.

Here, the polymer-self propagating high temperature reactant hollow yarns may be wound around a spinning wheel after passing through a separate washing bath. Further, the polymer-self propagating high temperature reactant hollow yarns wound around the spinning wheel may be subjected to another washing process. The separate washing process of the polymer-self propagating high temperature reactant hollow yarns wound around the spinning wheel may be performed at 30~100° C. for 6~168 hours, although not limited thereto. Finally, in S130, the polymer-self propagating high temperature reactant hollow yarns may be dried at 80~120° C. for 12~48 hours, although not limited thereto, to remove the water that has been provided by solvent exchange, which result in polymer-inorganic hollow yarns.

Since the wet spinning in S120 and the washing and drying in S130 are well known processes in the art in manufacture of the inorganic hollow yarns, any well-known methods may be adopted to perform these operations.

Next, in S140, the polymer-inorganic hollow yarns resulting from S130 is subjected to heat treatment, which removes polymer components remaining therein and induces self-propagating high temperature reaction to form self-propagating high temperature products, such as cermets, poorly sinterable non-oxides, and oxide-non oxide composites, thereby producing final inorganic hollow yarns. In one embodiment, the heat treatment is a single step heat treatment. In other embodiments, the heat treatment includes two or more heat treatment steps at different conditions such as temperatures, time and/or different conditions.

Here, heat treatment for the self-propagating high temperature reaction is performed in air, nitrogen, helium, argon or hydrogen atmosphere. To form a nitride, the heat treatment is advantageously performed in a nitrogen atmosphere. On the other hand, to form a cermet comprising a metallic component, heat treatment is advantageously carried out in nitrogen, helium, argon or hydrogen atmosphere. And, to form an oxide-carbide composite, heat treatment is advantageously carried out in air, nitrogen, helium, or argon atmosphere. In other words, one or two components of the self-propagating high temperature reactant may be supplied in the form of gas during the self-propagating high temperature reaction in S140 as well as in the preparation of the composition in S110.

The heat treatment in S140 initiates a reaction of the self-propagating high temperature reactant. The reaction is a strong exothermic one and generates high heat, which can reach several thousand degrees Celsius. This high temperature further triggers spontaneous, continuing reactions of the self-propagating high temperature reactant.

In embodiments, the heat treatment for the self-propagating high temperature reaction is performed at a temperature greater than or equal to an ignition temperature of the self-propagating high temperature reactant. The heat treatment triggers or induces the self-propagating high temperature reaction, which in turn fuels additional reactions of the self-propagating high temperature reactant. Although the temperature for heat treatment depends on the self-propagating high temperature reactant, the heat treatment of the self-propagating high temperature reaction may be performed at 1000~1800° C.

EXAMPLES

Next, the present invention will be described in more detail with reference to examples. Here, it should be understood that these examples are provided for the purpose of illustration only and are not intended to limit the scope of the invention in any sense.

A description of details apparent to a person having ordinary knowledge in the art will be omitted herein for clarity.

Example 1

$TiO_2$ powder having an average particle size of 0.2 µm, aluminum powder having an average particle size of #325, and colloidal graphite powder having an average particle size of 0.2 µm were dispersed in a molar ratio of 3:4:1.5 in acetone by a wet-type ball-mill, followed by drying at 60° C. for 24 hours in a vacuum, thereby preparing a 1000 g batch of $3TiO_2$-4Al-1.5C self-propagating high temperature reactant.

700 g of the self-propagating high temperature reactant, 100 g polysulfone, 30 g PVP, and 400 g N-methyl-2-pyrrolidone were added to 2000 ml polypropylene (PP), followed by dispersion using 400 g of zirconia ($ZrO_2$) balls at 150 rpm for 48 hours at room temperature to prepare a slurry composition. The slurry composition was degassed at 50° C. for 12 hours in a vacuum to prepare a slurry composition for wet spinning.

The prepared slurry composition was passed through a triple spinneret having diameters of 1.4-0.8-0.55 mm and was then dropped into a water bath for solvent exchange. The slurry composition was introduced at a pressure of 3 atm. into an outer orifice of the triple spinneret and an inflow speed of the slurry composition was adjusted using a gear pump, which was operated at 12 rpm. Further, water was introduced into an inner orifice of the triple spinneret at an inflow speed of 14 ml/min and a pressure of 5 MPa by an LC pump. The washing bath was filled with water at room temperature. A distance between an inlet of the triple spinneret and a water surface of the washing bath was 15 cm. Then, prepared polysulfone-$3TiO_2$-4Al-1.5C hollow yarns were washed with water for 48 hours at room temperature, followed by drying at 24 hours in a vacuum, thereby providing final polysulfone-$3TiO_2$-4Al-1.5C hollow yarns.

The final polysulfone-$3TiO_2$-4Al-1.5C hollow yarns were subjected to primary heat treatment at 800° C. for 4 hours to remove the polysulfone from the hollow yarns, and then subjected to secondary heat treatment at 1500° C. for 4 hours to induce self-propagating high temperature reaction ($3TiO_2$+4Al+1.5C=$2Al_2O_3$+1.5TiC-1.5Ti), thereby producing $Al_2O_3$—TiC—Ti inorganic composite hollow yarns. During the heat treatment, a temperature elevating rate was 4° C./min and a cooling rate was 4° C./min.

Figure 2A:
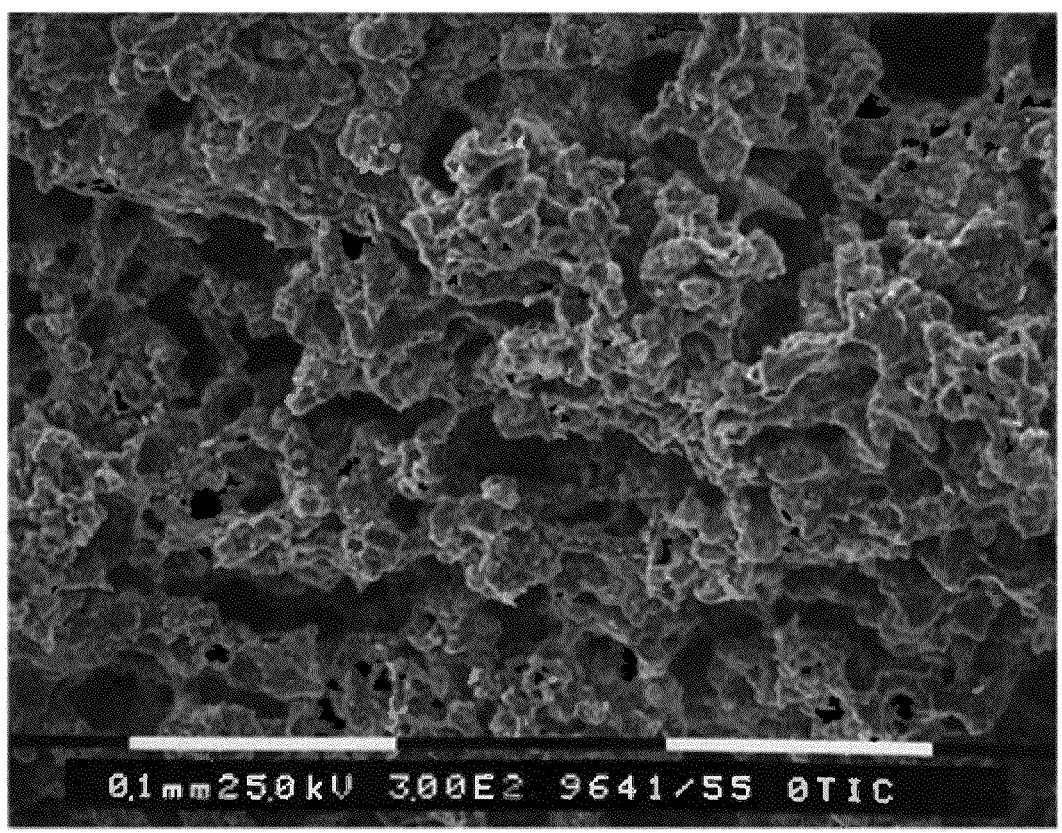
FIG. 2a is a scanning electron microscope (SEM) image of a fracture surface of an $Al_2O_3$—TiC—Ti hollow yarn manufactured by the method in accordance with the embodiment at a low magnification.
Figure 2B:
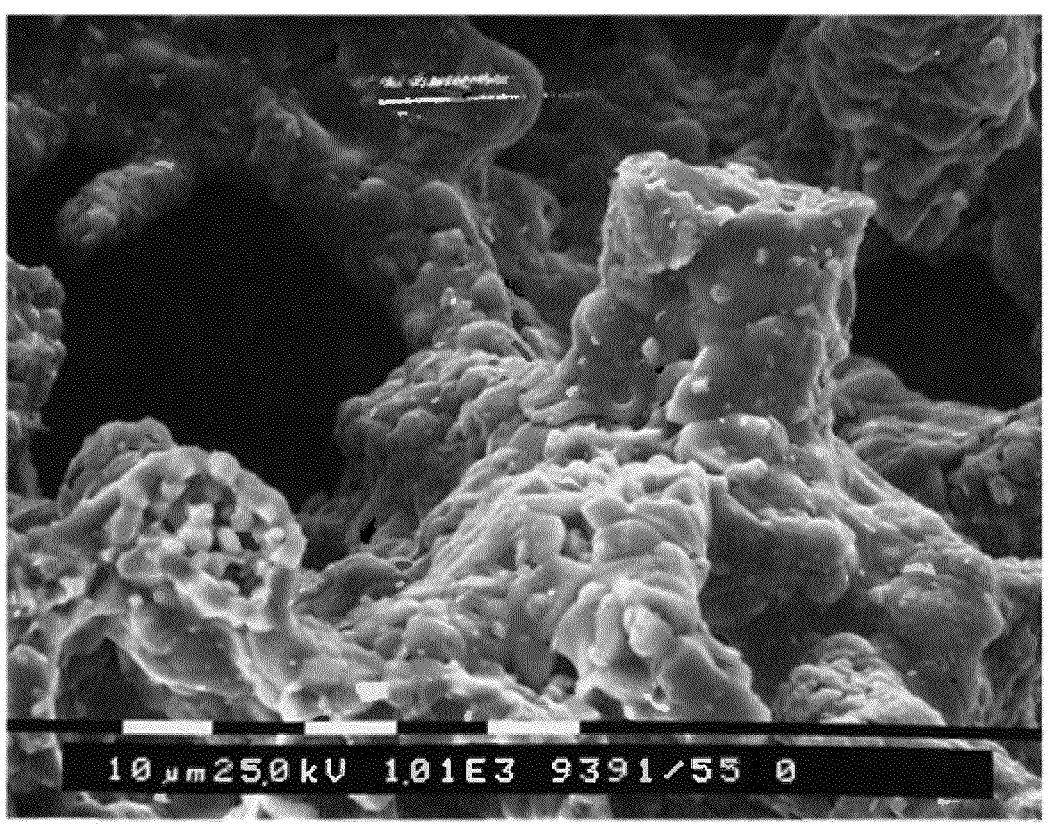
FIG. 2b is a SEM image of the fracture surface of the $Al_2O_3$—TiC—Ti hollow yarn manufactured by the method in accordance with the embodiment at a high magnification.

FIGS. 2a and 2b are SEM images of a fracture surface of the $Al_2O_3$—TiC—Ti hollow yarn at a low magnification and a high magnification, respectively. It can be seen that the produced $Al_2O_3$—TiC—Ti hollow yarn is a porous material, in which pores are three-dimensionally connected to one another and have a size of several dozen micrometers.

Example 2

Ti powder having an average particle size of #325, colloidal graphite powder having an average particle size of 0.2 µm and Ni powder having an average particle size of #325 were dispersed in a molar ratio of 1:1:1 by a dry-type vibration mill to prepare a 1000 g batch of Ti—C—Ni self-propagating high temperature reactant.

Polysulfone-Ti—C—Ni hollow yarns were prepared by the same process as the process of Example 1. The prepared polysulfone-Ti—C—Ni hollow yarns were subjected to primary heat treatment at 800° C. for 4 hours to remove the polysulfone from the hollow yarns, and then subjected to secondary heat treatment at 1500° C. for 4 hours to induce self-propagating high temperature reaction (Ti+C+Ni=TiC+Ni), thereby forming TiC—Ni inorganic composite hollow yarns. During the heat treatment, a temperature elevating rate was 4° C./min and a cooling rate was 4° C./min.

Figure 3A:
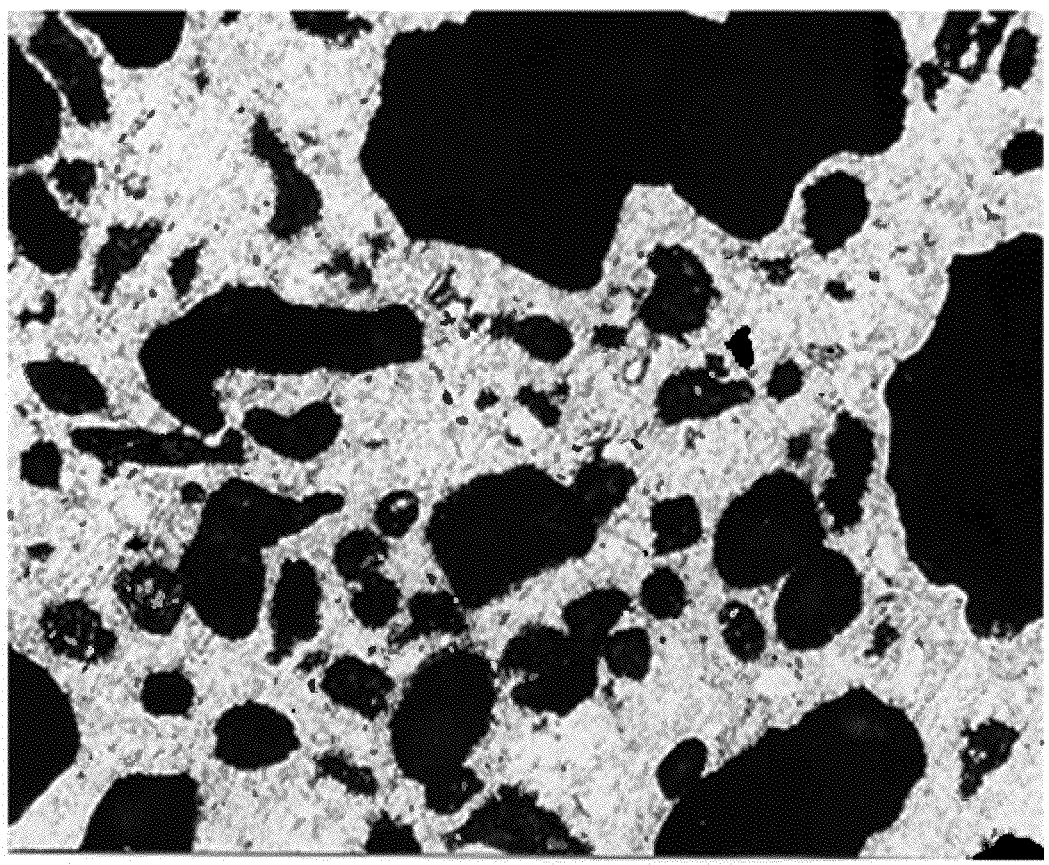
FIG. 3a is a SEM image of a fracture surface of a TiC—Ni hollow yarn manufactured by the method in accordance with the embodiment at a low magnification, with the fracture surface processed to form a mirror surface.
Figure 3B:
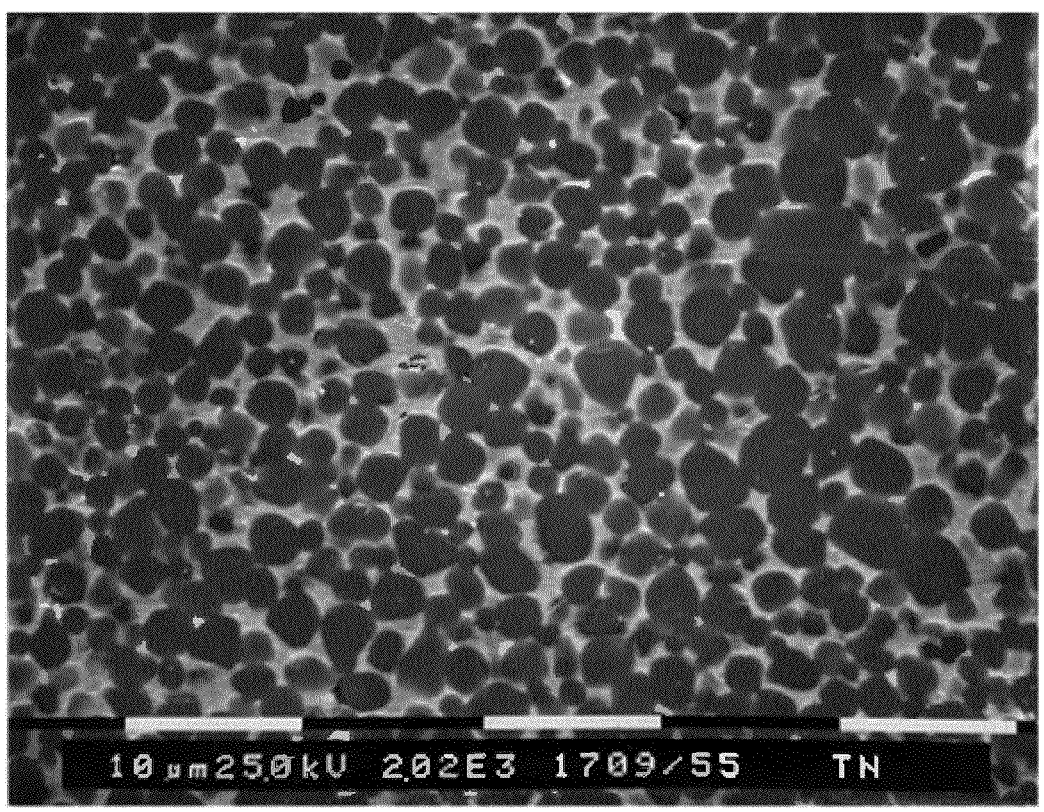
FIG. 3b is a SEM image of the fracture surface of the TiC—Ni hollow yarn manufactured by the method in accordance with the embodiment at a high magnification, with the fracture surface processed to form a mirror surface.

FIGS. 3a and 3b are SEM images of a fracture surface of the TiC—Ni hollow yarn at a low magnification and a high magnification, with the fracture surface processed to form a mirror surface. It can be seen that the produced TiC—Ni hollow yarn is a porous material, in which pores are three-dimensionally connected to one another and have a size of several dozen micrometers.

Example 3

Ti powder having an average particle size of #325 and boron (B) powder having an average particle size of #325 were dispersed in a molar ratio of 1:2 by a dry-type vibration mill to prepare a 100 g batch of Ti-2B self-propagating high temperature reactant.

Polysulfone-Ti-2B hollow yarns were prepared by the same process as the process of Example 1 with the batch size reduced to 1/10 that of Example 1. The prepared polysulfone-Ti-2B hollow yarns were subjected to primary heat treatment at 800° C. for 4 hours to remove the polysulfone from the hollow yarns, and then subjected to secondary heat treatment at 1500° C. for 4 hours to induce self-propagating high temperature reaction (Ti+2B=$TiB_2$), thereby forming $TiB_2$ inorganic composite hollow yarns. During the heat treatment, a temperature elevating rate was 4° C./min and a cooling rate was 4° C./min.

Figure 4A:
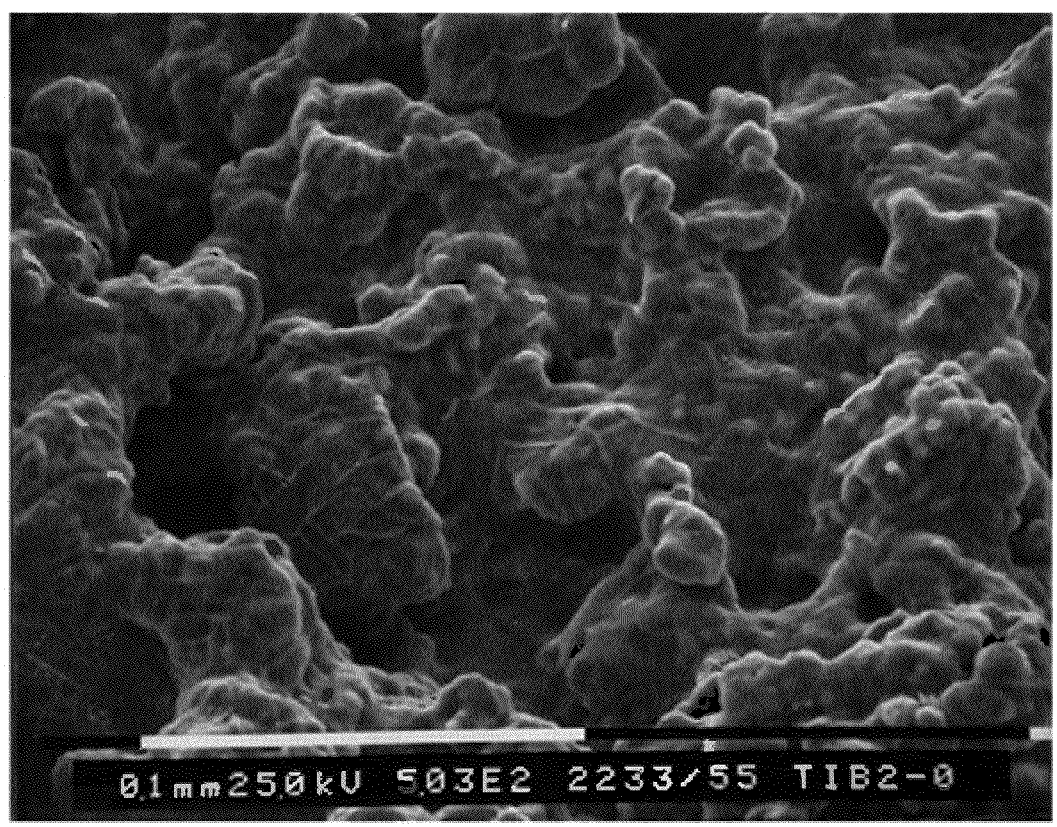
FIG. 4a is a SEM image of a fracture surface of a $TiB_2$ hollow yarn manufactured by the method in accordance with the embodiment at a low magnification.
Figure 4B:
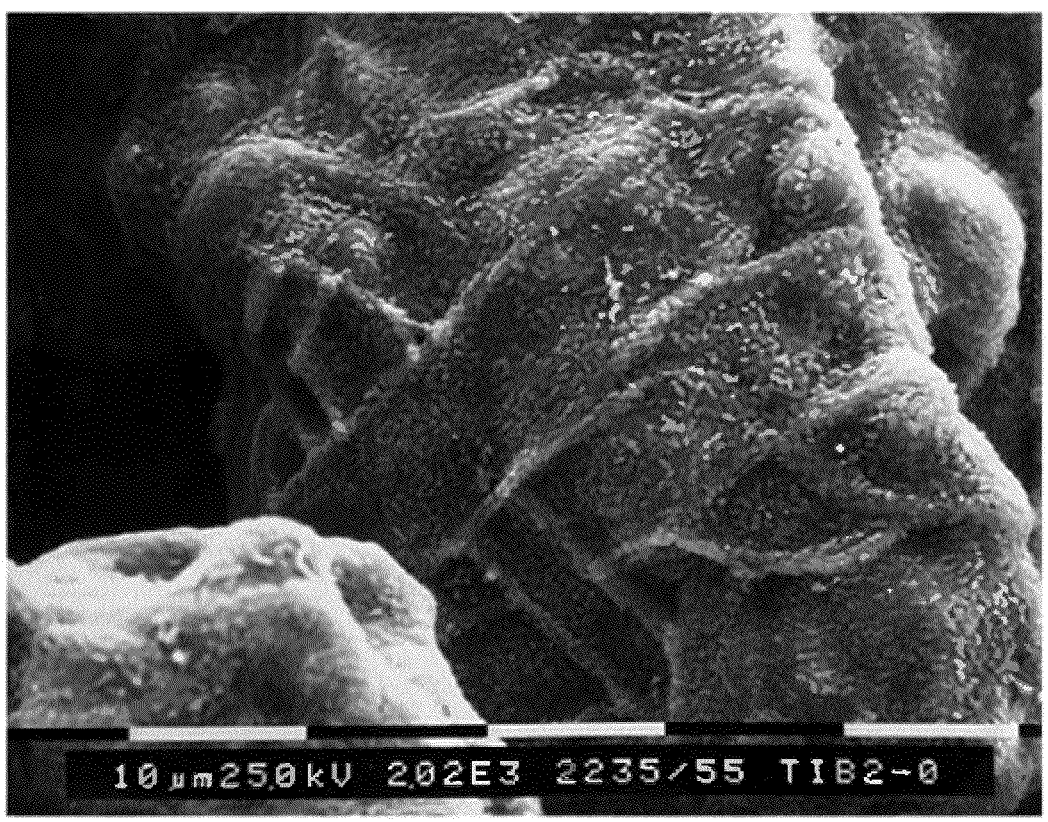
FIG. 4b is a SEM image of the fracture surface of the $TiB_2$ hollow yarn manufactured by the method in accordance with the embodiment at a high magnification.

FIGS. 4a and 4b are SEM images of a fracture surface of the $TiB_2$ hollow yarn at low and high magnifications, respectively. It can be seen that the prepared $TiB_2$ hollow yarn is a porous material, in which pores are three-dimensionally connected to one another and have a size of several dozen micrometers.

As such, according to various embodiments of the present invention, since the inorganic hollow yarns are formed by the self-propagating high temperature reaction which spontaneously proceeds using heat resulting from an initial strong exothermic reaction, the temperature of the self-propagating high temperature reactant reaches several thousand degrees Celsius, exceeding the temperature for heat treatment by the reaction heat, thereby enabling manufacture of the inorganic hollow yarns, which cannot be obtained through general heat treatment.

Namely, targets of the inorganic hollow yarns are mainly limited to oxides when produced by conventional sintering, whereas the method of the present invention may expand the targets of the inorganic hollow yarns to cermets, poorly sinterable non-oxides and oxide-non oxide composites.

According to the embodiment, the inorganic hollow yarn manufacturing method employs self-propagating high temperature reaction, thereby allowing more easy manufacture of poorly sinterable hollow yarns. Further, since the self-propagating high temperature reaction spontaneously occurs by allowing an initial local reaction to occur at relatively low temperatures, the method may achieve low energy consumption.

Further, the inorganic hollow yarns produced by the method of the embodiment have a porous structure suitable for filters or membranes, in which pores are spontaneously and three-dimensionally connected to one another by a density difference between reactants and products before and after the self-propagating high temperature reaction, and by a non-filled volume of the reactant.

Further, when a bundle of polymer-self propagating high temperature reactant hollow yarns is formed and then subjected to self-propagating high temperature reaction, the hollow yarns may be easily formed into a structure wherein the yarns are strongly connected to one another by high temperatures up to several thousand degrees Celsius.

Further, the poorly sinterable ceramic hollow yarns and cermet hollow yarns produced by the method according to the embodiment exhibit superior thermal, mechanical, and chemical properties, thereby providing stability in fabrication and reproduction of membrane modules. Further, since the poorly sinterable ceramic hollow yarns and cermet hollow yarns produced by the method according to the embodiment contain metal, the poorly sinterable ceramic hollow yarns and cermet hollow yarns exhibit good chemical affinity to metal and thus permit easy production of membrane modules, which are used at high temperatures.

Moreover, according to the embodiment, the inorganic hollow yarns have a low thermal expansion coefficient, so that an intermediate layer or separation layer may be prevented from being broken by thermal impact when formed of the inorganic hollow yarns, thereby improving reliability in fabrication of inorganic membranes.

Although some embodiments have been provided to illustrate the present invention in conjunction with the drawings, it will be apparent to a person having ordinary knowledge in the art that the embodiments are given by way of illustration only, and that various modifications and changes can be made without departing from the spirit and scope of the invention. The scope of the invention should be limited only by the accompanying claims.

What is claimed is:

1. A composition for inorganic hollow yarns comprising:
   45-60 wt % of a self-propagating high temperature reactant; 6-17 wt % of a polymer; 0.1-4 wt % of a dispersant; and
   the balance of an organic solvent.

2. The composition of claim 1, wherein the self-propagating high temperature reactant is a material capable of forming one of a ceramic-metal composite, an oxide-non oxide composite, or a poorly sinterable non-oxide.

3. The composition of claim 1, wherein the polymer is selected from the group consisting of polysulfone, polyethersulfone, polyacrylronitrile, cellulose acetate, polyvinylidene fluoride, and polyimide.

4. The composition of claim 1, wherein the organic solvent is selected from the group consisting of dimethylformamide, N-methyl-2-pyrrolidone, dimethylamide, dimethylacetamide, dimethyl sulfoxide, 1,4-dioxane, ethylene glycol monomethyl ether, ethylene glycol monoethyl ether, diethylene glycol dimethyl ether, diethylene glycol diethyl ether, and diethylene glycol dibutyl ether.

5. The composition of claim 1, further comprising:
   a diluent selected from oxide, nitride, carbide, and metal, the diluent being added in an amount of 50 parts by weight with respect to 100 parts by weight of the self-propagating high temperature reactant.

6. A composition for inorganic hollow yarns comprising:
   45-60 wt % of a self-propagating high temperature reactant; 6-17 wt % of a polymer; 0.1-4 wt % of a dispersant selected from the group consisting of polyvinylpyrrolidone (PVP), polyethylene glycol (PEG); and
   the balance of an organic solvent.

7. The composition of claim 6, wherein the self-propagating high temperature reactant is a material capable of forming one of a ceramic-metal composite, an oxide-non oxide composite, or a poorly sinterable non-oxide.

8. The composition of claim 6, wherein the polymer is selected from the group consisting of polysulfone, polyethersulfone, polyacrylronitrile, cellulose acetate, polyvinylidene fluoride, and polyimide.

9. The composition of claim 6, wherein the organic solvent is selected from the group consisting of dimethylformamide, N-methyl-2-pyrrolidone, dimethylamide, dimethylacetamide, dimethyl sulfoxide, 1,4-dioxane, ethylene glycol monomethyl ether, ethylene glycol monoethyl ether, diethylene glycol dimethyl ether, diethylene glycol diethyl ether, and diethylene glycol dibutyl ether.

10. The composition of claim 6, further comprising:
    a diluent selected from oxide, nitride, carbide, and metal, the diluent being added in an amount of 50 parts by weight with respect to 100 parts by weight of the self-propagating high temperature reactant.

* * * * *